United States Patent [19]
Yoshioka

[11] Patent Number: 5,290,080
[45] Date of Patent: Mar. 1, 1994

[54] POOPER SCOOPER
[75] Inventor: Mashayuki Yoshioka, Kanagawa, Japan
[73] Assignee: Olive Corporation, Tokyo, Japan
[21] Appl. No.: 96,542
[22] Filed: Jul. 22, 1993
[30] Foreign Application Priority Data
  Jul. 30, 1992 [JP] Japan .................. 4-223300
[51] Int. Cl.$^5$ .......................... A01K 29/00; E01H 1/12
[52] U.S. Cl. .................................... 294/1.5
[58] Field of Search ................ 294/1.3-1.5, 294/19.1, 55, 115; 15/104.8, 257.1, 257.6, 257.7; 119/161; 248/95, 99, 101

[56] References Cited
U.S. PATENT DOCUMENTS
  4,717,186  1/1988  Yoshioka .......................... 294/1.5
  4,878,703 11/1989  Yoshioka .......................... 294/1.5

Primary Examiner—Johnny D. Cherry
Attorney, Agent, or Firm—Martin E. Hsia

[57] ABSTRACT

A pooper scooper for disposing of solid wastes from a pet animal, comprises a relatively short body having a hollow portion provided in its interior and extending along a bottom portion thereof, the hollow portion having an opening at one end thereof, a linear slit extending along the bottom portion of the body, and a housing portion for carrying vertical stacked cartridges therein, the housing portion being provided in the interior of the body, situated on the hollow portion and communicating with the hollow portion, each of the cartridges including a pair of casing members hingedly connected at one ends thereof to each other and a sack supported and contained between the casing members in a manner to be folded up, a pair of receiving members movably inserted in the hollow portion for receiving a lowermost one of the cartridges, a pusher movably inserted within the hollow portion for pushing out of the opening of the hollow portion the lowermost cartridge received by the receiving members, the receiving members pivotally connected at one ends thereof to the pusher, between which receiving members a spring is stretched, to thereby alway urge the receiving members to be opened away from each other, cooperating members on the receiving members and the casing members to be separately held on the receiving members when each of the cartridges is received by the receiving members, and a button arranged on an outer surface of the bottom portion of the body and supported through the slit of the body to the pusher.

17 Claims, 7 Drawing Sheets

POOPER SCOOPER

BACKGROUND OF THE INVENTION

1. Field of the Invention

This invention relates to an improvement of a pooper scooper for disposing of solid wastes from a pet animal such as a dog or the like, and more particularly to a pooper scooper which is adapted to be pointed to a rump of a pet animal by a user, when the pet animal acts as if it was ready to excrete solid wastes, to receive solid wastes excreted from it.

2. Description of the Prior Art

This kind of pooper scooper is disclosed in U.S. Pat. No. 4,717,186 to Mashayuki Yoshioka or the inventor of the present invention. The conventional pooper scooper comprises an elongated tubular body; storage means mounted on an upper wall of the elongated tubular body for carrying vertically stacked cartridges therein; and an elongated pushing rod movably inserted at its one end portion in a longitudinal bore of the tubular body for pushing a cartridge toward one end of the tubular body. The other end portion of the pushing rod is projected outwardly from the other end of the tubular body. Each of the cartridges comprises a pair of casing members pivotally connected at one ends thereof to each other, and a sack for receiving solid wastes from a pet animal. The sack has an opening at an upper portion thereof and a resilient wire provided along a margin of the opening. The sack is supported between the casing members through the resilient wire and contained between the casing members in a manner to be folded up. The resilient wire always urges the casing members to be opened away from each other. The cartridge is adapted to be stored within the storage means with the casing members being closed toward each other against an action of the resilient wire. When a user grips the other end portion of the pushing rod and pushes the pushing rod towards the one end of the tubular body, a lowermost one of the cartridges housed in the storage means is adapted to be moved toward the one end of the tubular body and operatively projected outwardly from the end of the tubular body. At this time, the casing members of the cartridge are opened away from each other due to the action of the resilient wire, whereby the sack is completely spread. In this condition, the user points the tubular body to a pet animal in a manner to cause the spread sack to be held to a rump of the pet animal, whereby the sack can receive solid wastes from the pet animal. In the pooper scooper, the elongated pushing rod is indispensable for causing a cartridge to be operatively projected outwardly from the one end of the elongated tubular body and the other end portion of the pushing rod is projected outwardly from the other end of the tubular body in order to permit the user to grip the other end portion of the pushing rod. Therefore, the conventional pooper scooper is necessarily long as a whole and unhandy to carry.

U.S. Pat. No. 4,878,703 to Mashayuki Yoshioka, or the inventor of the present invention, discloses this kind of pooper scooper in which pusher means for pushing a cartridge is adapted to be automatically moved in a longitudinal bore of a tubular body by actuating means. This conventional pooper scooper may be so designed as to be relatively short and compact as a whole, because the overall pusher means is incorporated in the longitudinal bore of the tubular body. However, the conventional pooper scooper includes the actuating means such as a reversible motor, so that the pooper scooper becomes heavier than that of U.S. Pat. No. 4,717,186.

SUMMARY OF THE INVENTION

The present invention has been made with a view to overcoming the foregoing problems of the prior art pooper scoopers.

It is therefore an object of the present invention to provide a pooper scooper for disposing of solid wastes from a pet animal, which is relatively short and compact as a whole, and lightweight.

It is another object of this invention to provide a pooper scooper for disposing of solid wastes from a pet animal, which is simple in construction and can be formed easily.

In accordance with the present invention, a pooper scooper for disposing of solid wastes from a pet animal is provided. The pooper scooper comprises a relatively short body having hollow means provided in its interior in a manner to extend along a bottom portion of the body, the hollow means having an opening formed at one end thereof as a continuation of the hollow means to communicate with the exterior of the body, linear slit means formed in the bottom portion of the body in a manner to extend along the bottom portion of the body and communicating between the hollow means and the exterior of the body, and housing means for carrying vertically stacked cartridges therein, the housing means being provided in the interior of the body, situated on the hollow means and communicating with the hollow means; each of the cartridges including a pair of casing members hingedly connected at one ends thereof to each other and sack means having an opening for receiving solid wastes from the pet animal, the sack means supported and contained between the casing members in a manner to be folded up; cartridge receiving means movably inserted in the hollow means of the body for receiving a lowermost one of the cartridges within the housing means when the lowermost cartridge drops down from the housing means toward the hollow means by gravity; pusher means movably inserted within the hollow means of the body for pushing out of the opening of the hollow means the cartridge received by the cartridge receiving means; the cartridge receiving means including a pair of cartridge receiving members pivotally connected at one ends thereof to the pusher means, and spring means provided between the cartridge receiving members to always urge the cartridge receiving members to be opened away from each other; cooperating means on the cartridge receiving members and the casing members of each of the cartridges for causing one of the casing members to be held on one of the cartridge receiving members and causing the other of the casing members to be held on the other of the cartridge receiving members when each of the cartridges is received by the cartridge receiving means; and slidable button means arranged on an outer surface of the bottom portion of the body and supported through the linear slit means to the pusher means, so that when a user causes the button means to be slid along the slit means while pushing the button means, the pusher means can be moved along the hollow means while pushing the cartridge receiving means.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENT

Figure 1:
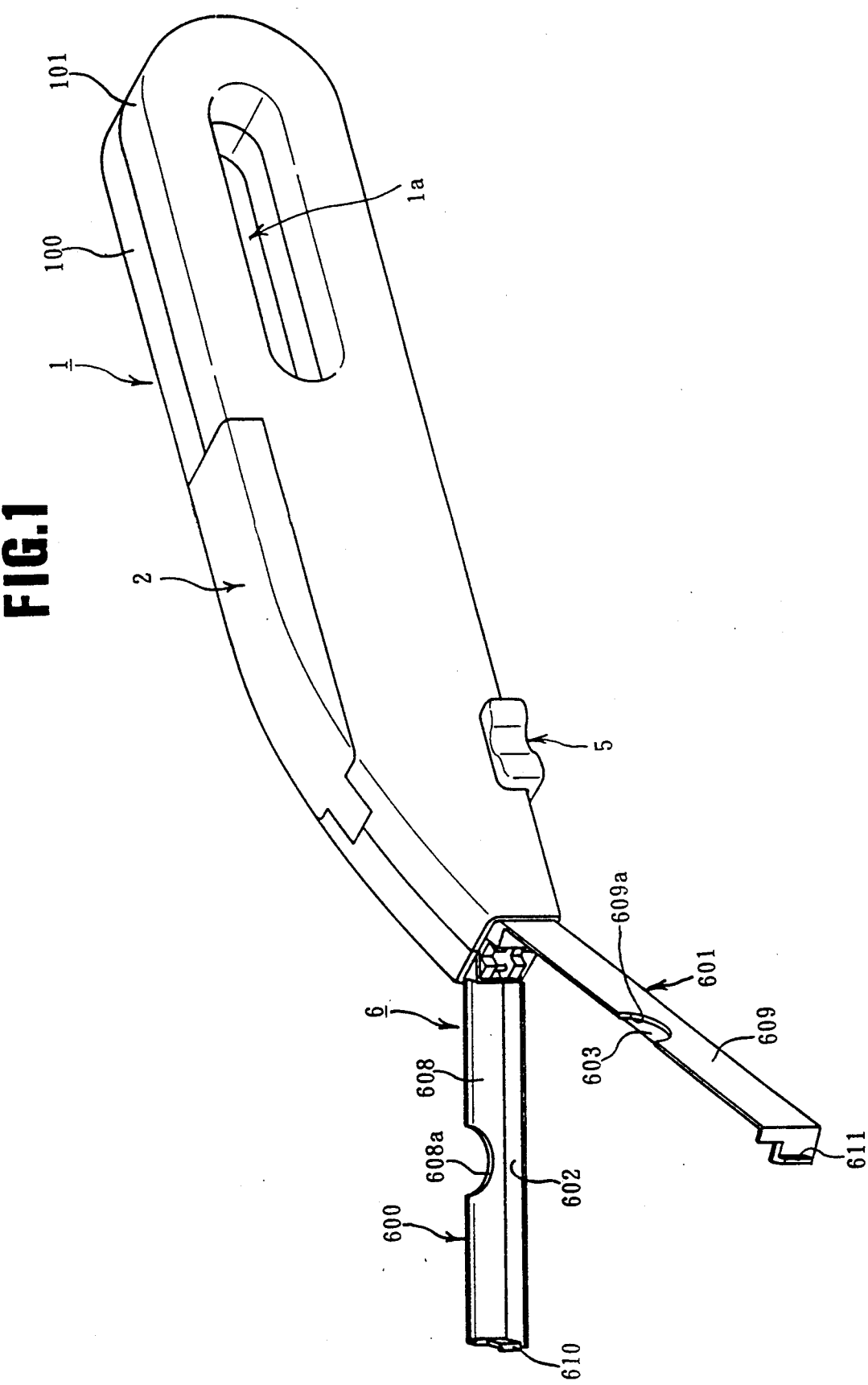
FIG. 1 is a schematic perspective view from the top of a pooper scooper according to an embodiment of the present invention.
Figure 2:
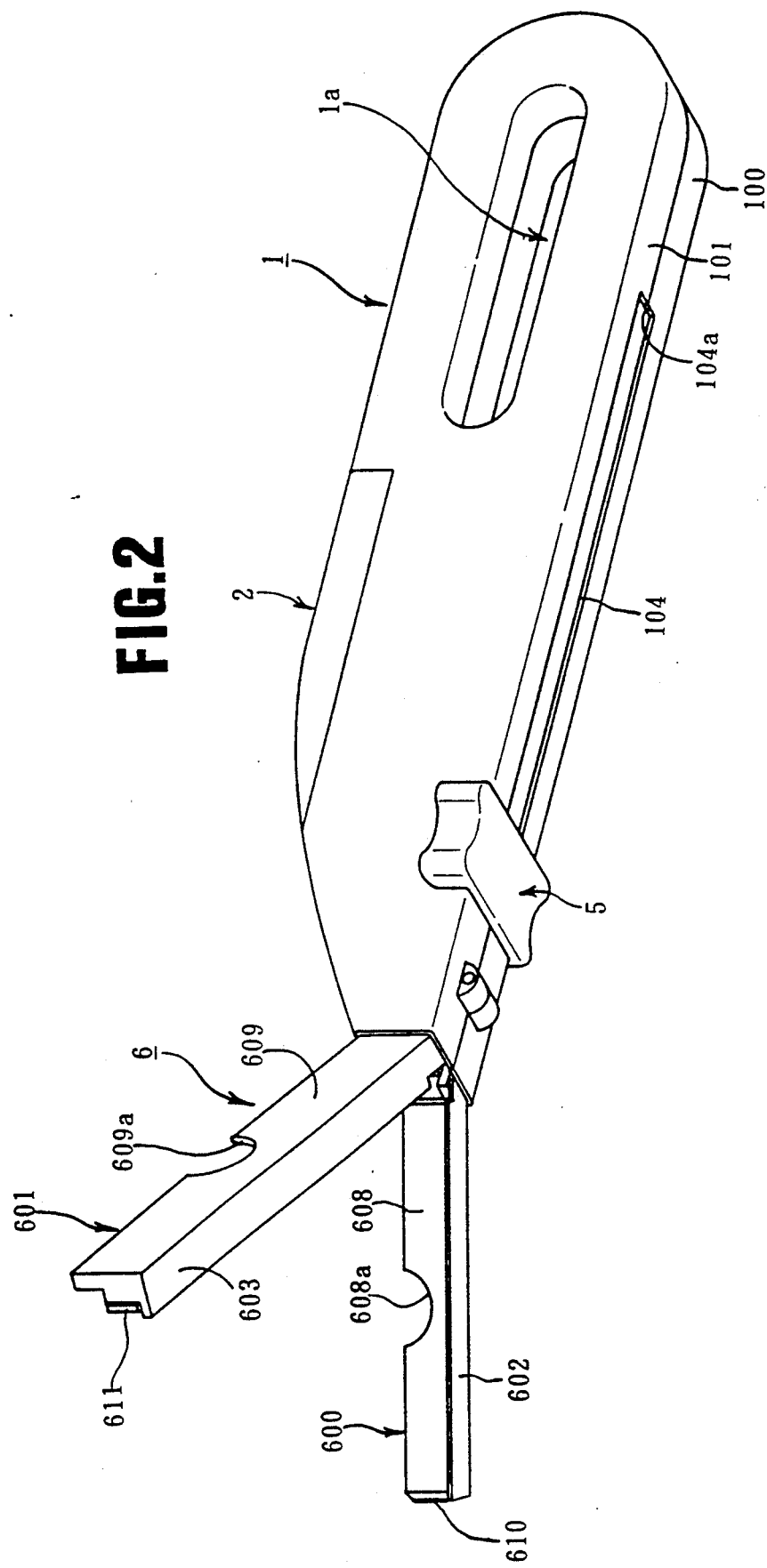
FIG. 2 is a schematic perspective view from the bottom of the pooper scooper.

Referring to FIGS. 1 and 2, a pooper scooper according to the present invention includes a relatively short body 1 of a substantially streamline shape. The body 1 has a first section 100 and a second section 101 which are fitted together and fastened together by means of screws (not shown). The first section 100 and second section 101 are made of lightweight material such as plastic or the like. The body 1 further has a through-hole 1a for allowing a user to insert the user's fingers therethrough in order to grip the body 1.

Figure 3:
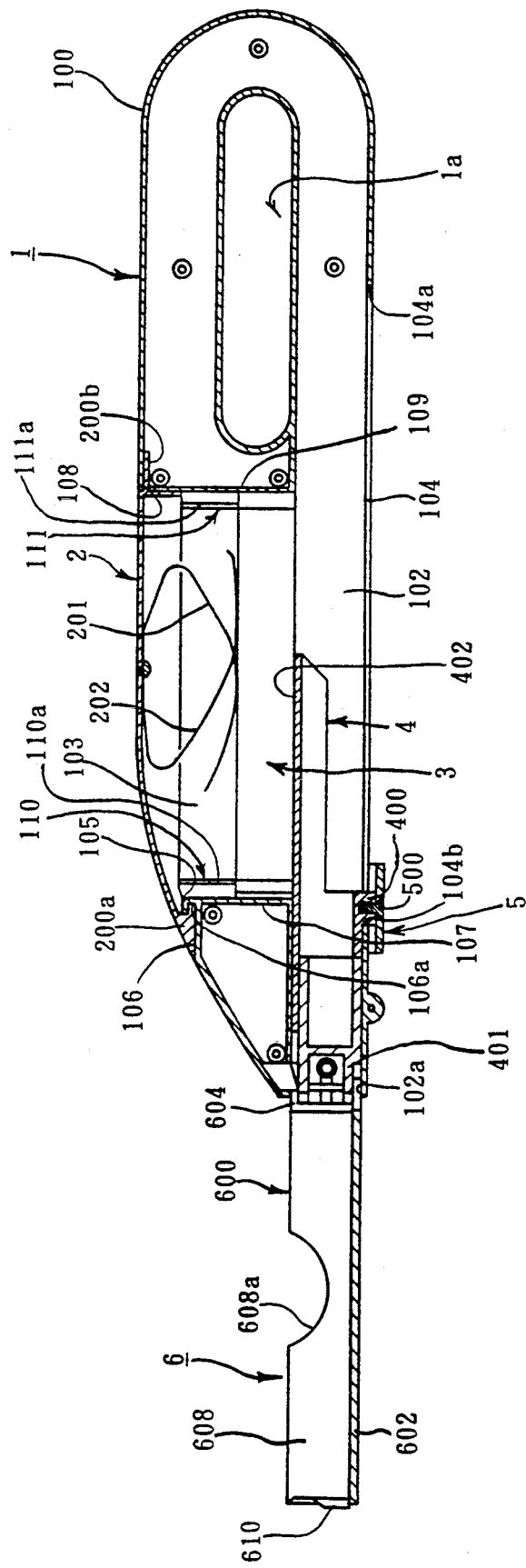
FIG. 3 is a schematic sectional view of the pooper scooper.

Referring to FIG. 3, the body 1 has a hollow portion 102 provided in its interior in a manner to extend along a bottom of the body 1, and a housing portion 103 for carrying vertically stacked cartridges therein. The hollow portion 102 is opened at one end 102a thereof. The housing portion 103 is provided in the interior of the body 1, situated on the hollow portion 102 and communicates with the hollow portion 102. The body 1 further has a linear slit 104 formed in the bottom portion thereof in a manner to extend along the bottom portion of the body 1, and communicating between the hollow portion 102 and the exterior of the body 1. An upper portion 105 of the housing portion 103 is opened. A recess 106 is formed in a portion of the body 1 which is in close proximity to an upper edge portion of a wall 107 of the housing portion 103. The recess 106 has a dent portion 106a extending toward the housing portion 103. A through-hole 108 is formed in an upper portion of a wall 109 of the housing portion 103 which is opposite to the wall 107 of the housing portion 103. The cartridges are adapted to be put into the housing portion 103 through the opened upper portion 105 of the housing portion 103. The opened upper portion 105 of the housing portion 103 is adapted to be covered by cover means 2.

Figure 4:
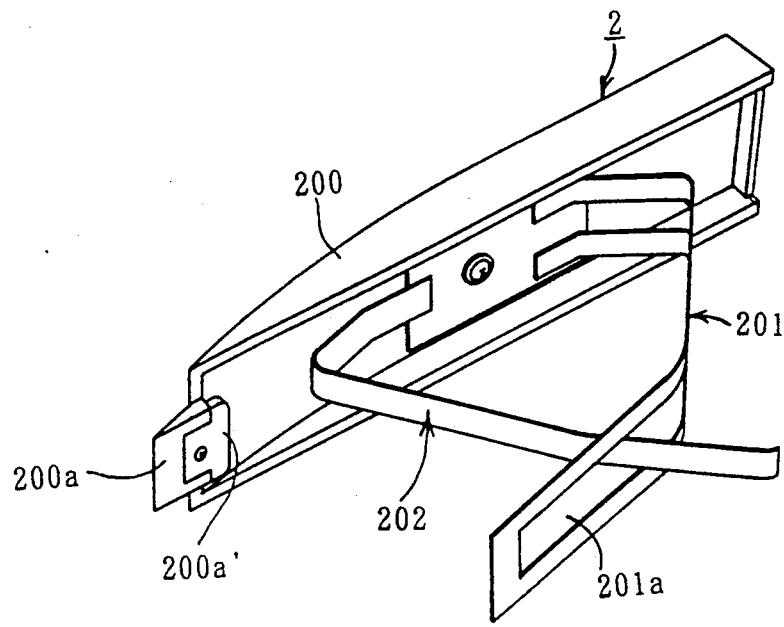
FIG. 4 is an enlarged perspective view of cover means for covering a housing portion.

Referring now to FIG. 4, the cover means 2 comprises a substantially plate-like body 200 having a curved upper surface, and first and second leaf springs 201 and 202 which are provided on an under surface of the plate-like body 200. The plate-like body 200 is made of lightweight material such as plastic or the like, while each of the first and second leaf springs 201 and 202 is made of a stainless steel sheet. More particularly, the first leaf spring 201 has an elongated through-hole 201a formed by punching a portion of the first leaf spring 201 and is attached at one end portion thereof to the plate-like body 200. The second leaf spring 202 is also attached at one end portion thereof to the plate-like body 200. The first leaf spring 201 and the second leaf spring 202 cross each other by causing a free end of the second leaf spring 202 to be inserted through the elongated through-hole 201a of the first leaf spring 201. The plate-like body 200 has a first projecting piece 200a extending laterally from one end of the plate-like body 200, and a second projecting piece 200b (see FIG. 3) extending laterally from the other end of the plate-like body 200. The first projecting piece 200a has an engaging projection 200a' extending in the direction opposite to the direction in which the first projecting piece 200a extends. The opened upper portion 105 of the housing portion 103 is adapted to be covered with the cover means 2 by inserting the leaf springs 201 and 202 into the housing portion 103, causing the first projecting piece 200a of the cover means 2 to be received within the recess 106 of the body 1, and causing the second projecting piece 200b of the cover means 2 to be inserted through the through-hole 108 of the body 1. When the opened upper portion 105 of the housing portion 103 is covered by the cover means 2 in the manner as described above, the projection 200a' of the first projecting piece 200a is adapted to be engaged with the dent portion 106a of the recess 106. Thus, when the opened upper portion 105 of the housing portion 103 is covered by the cover means 2, the cartridges 3 stored within the housing portion 103 are urged toward the hollow portion 102 of the body 1 due to actions of the first and second leaf springs 201 and 202.

Figure 5:
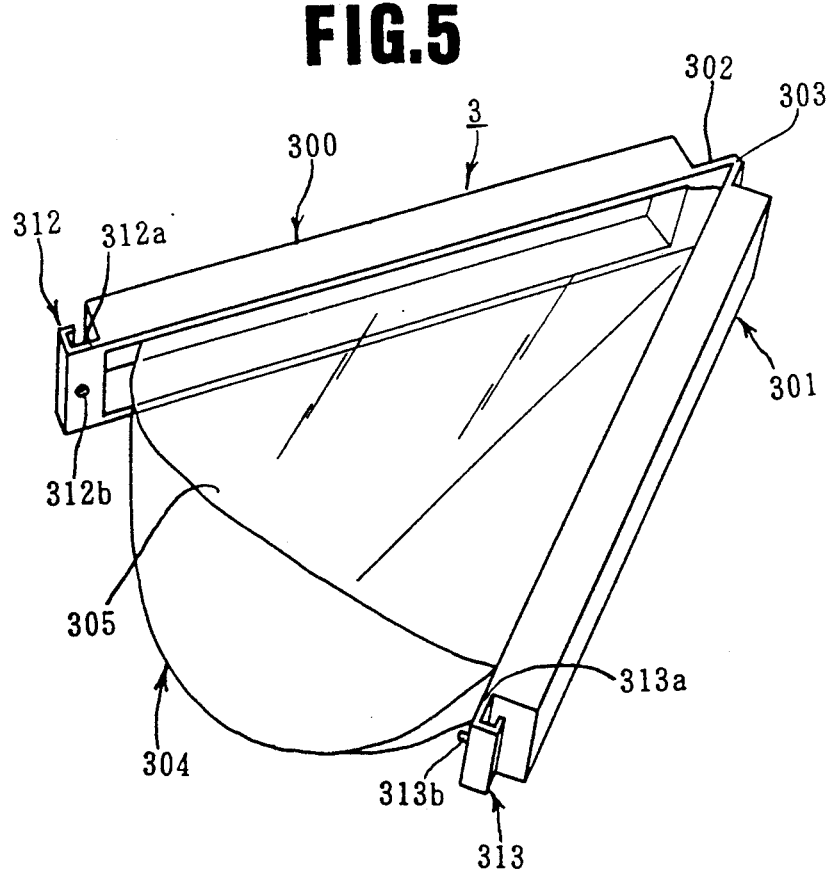
FIG. 5 is an enlarged perspective view of a cartridge.

Referring to FIG. 5, each of the cartridges 3 stored within the housing portion 103 comprises a pair of casing members 300 and 301, each taking the form of a substantially elongated box-like body having a substantially U-like configuration in vertical section. The casing members 300 and 301 are hingedly connected at one ends thereof to each other in a manner to be faced to each other at opened sides thereof. More particularly, the casing members 300 and 301 are formed of plastic material such as polyethylene and integrally interconnected at faced edges of the one ends thereof through an intermediate section 302. The intermediate section 302 is formed with a fold line 303 extending vertically at substantially the midpoint along a width length of the intermediate section 302. The fold line 303 acts as a hinge between the casing members 300 and 301 and enables the casing members 300 and 301 to be pivoted about the fold line 303. Supported between the faced sides of the casing members 300 and 301 is a sack 304 having an opening 305 formed at a top portion thereof for receiving solid wastes from a pet animal. More particularly, a part of a margin of the opening 305 of the sack 304 is attached onto inner surfaces of the casing members 300 and 301 by adhesives. The sack 304 is folded up and contained between the casing members 300 and 301 by causing the casing members 300 and 301 to be closed toward each other. The sack 304 is formed of polyethylene or the like. The cartridge 3 is stored within the housing portion 103 with the casing members 300 and 301, between which the sack 304 is contained, being closed toward each other.

Figure 6:
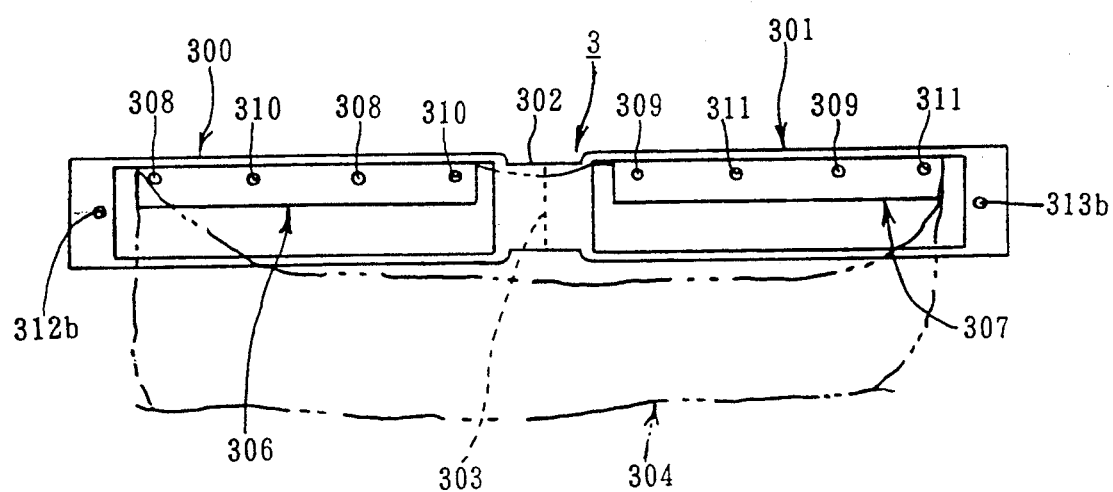
FIG. 6 is a schematic view of an alternative design for the cartridge of FIG. 5, in which casing members of the cartridge are completely opened away from each other.

Referring now to FIG. 6, the attaching of the sack 304 to the casing members 300 and 301 may be carried out by using first and second elongated mounting plates 306 and 307. When the mounting plates 306 and 307 are employed, first posts 308 are provided on the inner surface of the casing member 300 and second posts 309 are provided on the inner surface of the casing member 301. Bearing on this, first holes 310 corresponding in number to the first posts 308 of the casing member 300 are formed in the first mounting plate 306 and second holes 311 corresponding in number to the second posts 309 of the casing member 301 are formed in the second mounting plate 307. Each of the mounting plates 306 and 307 is formed of plastic such as polyethylene. The attaching of the sack 304 to the casing members 300 and 301 by the mounting plates 306 and 307 is carried out by putting a part of the margin of the opening 305 of the sack 304 on the first and second posts 308 and 309, fitting the first mounting plate 306 on the first posts 308 of the casing member 300 through the first holes 310 of the first mounting plate 306, and fitting the second mounting plate 307 on the second posts 309 of the casing member 301 through the second holes 311 of the second mounting plate 307. Thus, the sack 304 is securely and easily attached to the casing members 300 and 301 by the mounting plates 306 and 307 with the part of the margin of the opening 305 thereof being interposed between the casing members 300, 301 and the mounting plates 306, 307.

Again referring to FIG. 3, pusher means 4 of a substantially L-shape is movably inserted within the hollow portion 102. The pusher means 4 is provided with a projection 400 projecting downwardly from an under surface of the pusher means 4. The projection 400 penetrates the linear slit 104 of the body 1. In FIG. 3, reference numeral 5 denotes a slidable button which is arranged on an outer surface of the bottom portion of the body 1 and supported to the projection 400 of the pusher means 4 by a screw 500. When a user causes the button 5 to be slid along the linear slit 104 of the body 1 while pushing the button 5, the pusher means 4 is moved along the hollow portion 102.

In FIGS. 1 to 3, reference numeral 6 denotes cartridge receiving means for receiving a lowermost one of the cartridges 3 within the housing portion 103 when the lowermost cartridge drops down from the housing portion 103 toward the hollow portion 102. The cartridge receiving means 6 comprises a pair of cartridge receiving members 600 and 601, each having a substantially L-like configuration in vertical section. The cartridge receiving members 600 and 601 are pivotally connected at one ends thereof to a tip end of the pusher means 4 with horizontal portions 602 and 603 thereof being faced to each other.

Figure 7:
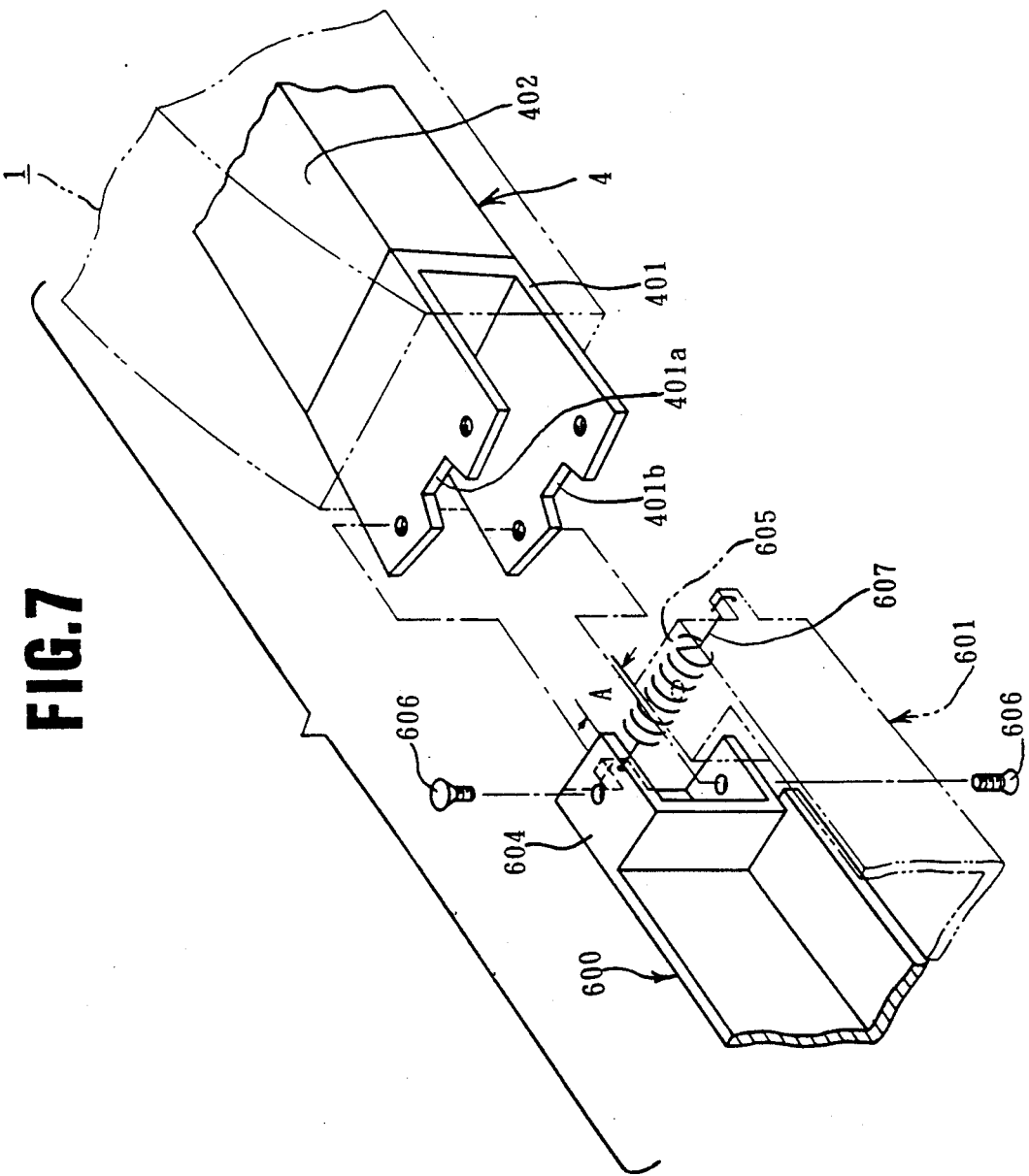
FIG. 7 is an exploded perspective view of cartridge receiving members and pusher means.

Referring now to FIG. 7, the receiving members 600 and 601 respectively have root portions 604 and 605 integrally formed at one ends thereof, each of which root portions 604 and 605 is of a substantially U-shape in vertical section. The pusher means 4 has a bracket 401 of a substantially U-shape in vertical section integrally formed at the tip end thereof. The U-shaped bracket 401 is formed with notches 401a and 401b at upper and lower horizontal portions thereof. The notches 401a and 401b are aligned with each other. The cartridge receiving members 600 and 601 are pivotally connected to the bracket 401 of the pusher means 4 by fitting the U-shaped root portions 604 and 605 of the cartridge receiving members 600 and 601 on the bracket 401 and causing the root portions 604 and 605 to be supported to the bracket 401 by means of pins 606. More particularly, the receiving members 600 and 601 are pivotally connected to the bracket 401 with the root portions 604 and 605 thereof being spaced apart from each other at an interval A slightly wider than a width of each of the notches 401a and 401b of the bracket 401. The space A between the root portions 604 and 605 is aligned with the notches 401a and 401b of the bracket 401. Stretched between the root portions 604 and 605 of the cartridge receiving members 600 and 601 is a spring 607. The spring 607 always urges the cartridge receiving members 600 and 601 to be opened away from each other.

In a state shown in FIGS. 1-3, when a user causes the button 5 to be slid toward a first end 104a of the linear slit 104 while pushing the button 5, the cartridge receiving members 600 and 601 are retracted into the hollow portion 102 of the body 1 while being closed toward each other against an action of the spring 607. When the button 5 is further moved toward the first end 104a of the linear slit 104 and the projection 400 of the pusher means 4 is abutted against the first end 104a of the linear slit 104, the closed receiving members 600 and 601 are adapted to arrive at a position just below the housing portion 103 and a space between vertical portions 608 and 609 of the cartridge receiving members 600 and 601 is aligned with the housing portion 103. At this time, a lowermost one of the cartridges 3 vertically stacked within the housing portion 103 will fall down into the space between the vertical portions 608 and 609 of the cartridge receiving members 600 and 601 by gravity.

Incidentally, since the cartridges 3 housed within the housing portion 103 are supported on a horizontal section 402 (see FIGS. 3 and 7) of the pusher means 4 until the cartridge receiving members 600 and 601 arrive at the position just below the housing portion 103, a lowermost cartridge does not fall to the hollow portion 102.

The pooper scooper according to the present invention further includes cooperating means for causing one of the casing members 300 and 301 of a cartridge 3 to be held on one of the cartridge receiving members 600 and 601 and causing the other of the casing members 300 and 301 to be held on the other of the cartridge receiving members 600 and 601, when the cartridge 3 drops down into the space between the vertical portions 608 and 609 of the cartridge receiving members 600 and 601.

Again referring to FIGS. 1 to 3 and 5, the cooperating means will be discussed. The cooperating means comprises hook-like pieces 312 and 313 which are projected laterally from faced edge portions of free ends of the casing members 300 and 301 as shown in FIG. 5, and projections 610 and 611 which are projected laterally from faced edge portions of free ends of the receiving members 600 and 601 as shown in FIGS. 1 to 3. The hook-like pieces 312 and 313 are bent in a manner to extend in directions opposite to each other.

As shown in FIG. 5, a root portion 312a of the hook-like piece 312 is formed with a through-hole 312b, and a root portion 313a of the hook-like piece 313 is provided with a projection 313b which is adapted to be fitted in the through-hole 312b of the hook-like piece 312 when the casing members 300 and 301 are closed toward each other. By the fitting of the projection 313b of the casing member 300, the casing members 300 and 301 can be maintained closed toward each other. Thus, the casing members 300 and 301 can be prevented from being accidentally opened away from each other during storage. A plurality of through-holes 312b and a plurality of projections 313b may be formed at portions of the casing members 300 and 301 in order to further securely prevent the casing members 300 and 301 from being accidentally opened away from each other.

Figure 8:
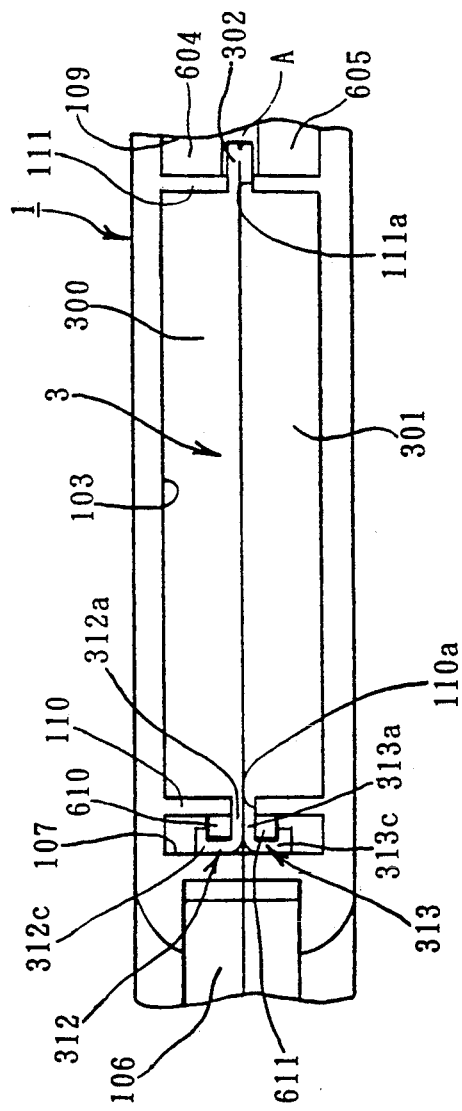
FIG. 8 is an enlarged plan view of the housing portion in which the cartridge is stored.

Referring now to FIG. 8, the cartridge receiving members are so designed as to permit a space to be provided between the projections 610 and 611 thereof when the receiving members 600 and 601 are closed toward each other against the action of the spring 607 stretched between the cartridge receiving members 600 and 601. When a lowermost one of the cartridges 3 vertically stacked within the housing portion 103 drops down to the cartridge receiving members 600 and 601 having been located at the position just below the housing portion 103, the casing members 300 and 301 of the cartridge 3 which are in a state of being closed toward each other are received in the space between the receiving members 600 and 601. At this time, as shown in FIG. 8, the root portions 312a and 313a of the hook-like pieces 312 and 313 of the closed casing members 300 and 301 enter the space between the projections 610 and 611 of the cartridge receiving members 600 and 601. Simultaneously, the hook-like pieces 312 and 313 come to be engaged with the projections 610 and 611, respectively. Also, a tip end portion of the folded intermediate section 302 of the cartridge 3 is received in the space A between the root portions 604 and 605 of the cartridge receiving members 600 and 601. Thus, when a lowermost one of the cartridges 3 vertically stacked within the housing portion 103 drops down on the receiving members 600 and 601, the casing members 300 and 301 of the lowermost cartridge 3 are separately held on the receiving members 600 and 601 through the cooperating means.

Guide means for guiding the cartridges 3 vertically stacked within the housing portion 103 may be provided in the interior of the housing portion 103. More particularly, as shown in FIGS. 3 and 8, guide plates 110 and 111 are arranged in the interior of the housing portion 103 in parallel with the walls 107 and 109 of the housing portion 103. The guide plates 110 and 111 respectively have linear guide slits 110a and 111a extending vertically. Where the guide means is employed and a cartridge is to be housed within the housing portion 103, the root portions 312a and 313a of the hook-like pieces 312 and 313 of the casing members 300 and 301 are received in the linear guide slit 110a. Bent portions 312c and 313c of the hook-like pieces 312 and 313 of the casing members 300 and 301 are received in a space between the wall 107 of the housing portion 103 and the guide plate 110. Also, the folded intermediate section 302 of the cartridge 3 is received in the linear guide slit 111a with a tip end portion thereof being received in a space between the wall 109 of the housing portion 103 and the guide plate 111. Thus, cartridges 3 can be housed within the housing portion 103 while being guided along the linear slits 110a and 111a. In this case, the linear guide slit 110a is so designed as to be aligned with the space between the projections 610 and 611 of the cartridge receiving members 600 and 601 when the cartridge receiving members 600 and 601 are located at the position just below the housing portion 103. Similarly, the linear slit 111a is so designed as to be aligned with the space A between the root portions 604 and 605 of the cartridge receiving members 600 and 601 when the cartridge receiving members 600 and 601 are located at the position just below the housing portion 103. Thus, when a lowermost one of the cartridges 3 vertically stacked within the housing portion 103 drops down, the root portions 312a and 313a of the hook-like pieces 312 and 313 of the cartridge 3 which are received in the linear guide slit 110a can be smoothly received in the space between the projections 610 and 611 of the cartridge receiving members 600 and 601. Similarly, the folded intermediate section 302 of the lowermost cartridge 3 can be smoothly received into the space A between the root portions 604 and 605 of the cartridge receiving members 600 and 601.

The operation of the pooper scooper according to the present invention will be described with reference to the accompanying drawings.

When the cartridge receiving members 600 and 601 in a state of being closed toward each other against the action of the spring 607 stretched between the cartridge receiving members 600 and 601 are located at the position just below the housing portion 103, a lowermost one of the cartridges 3 vertically stacked within the housing portion 103 drops down on the receiving members 600 and 601 by gravity and the hook-like pieces 312 and 313 are respectively engaged with the projections 610 and 611 of the cartridge receiving members 600 and 601, whereby the casing members 300 and 301 of the lowermost cartridge 3 are separately held on the cartridge receiving members 600 and 601 as shown in FIG. 8. In this state, when the button 5 is slid toward a second end 104b of the linear slit 104 of the body 1 by a user, the cartridge receiving members 600 and 601 having the casing members 300 and 301 held thereon are moved toward the opening 102a of the hollow portion 102 and then operatively projected out from the opening 102a. At this time, the cartridge receiving members 600 and 601 are opened away from each other due to the action of the spring 607 stretched between the cartridge receiving members 600 and 601 as shown in FIGS. 1-3, whereby the casing members 300 and 301 separately held on the cartridge receiving members 600 and 601 are simultaneously opened away from each other while causing the projection 313b of the casing member 301 to be released from the through-hole 312b of the casing member 300. As a result, the opening 305 of the sack 304 supported between the casing members 300 and 301 is completely opened. In a state of the opening 305 of the sack 304 being opened, the user points the body 1 to a pet animal in a manner to cause the opened sack 304 to be held to a rump of the pet animal, whereby the sack 304 can receive solid wastes from the pet animal.

After the cartridge 3 has received solid wastes from the pet animal through the sack 304 thereof, the user removes the cartridge 3 from the cartridge receiving members 600 and 601 by picking up the cartridge 3 while causing the casing members 300 and 301 to be closed toward each other with the user's fingers and fitting the projection 313b of the casing member 301 into the through-hole 312b of the casing member 300. Then, the cartridge is dumped into a waste box.

Incidentally, in order that a user may easily remove the casing members 300 and 301 of the cartridge 3 from the cartridge receiving members 600 and 601 with the user's fingers after the cartridge receives solid wastes from a pet animal through the sack 304 thereof, notches 608a and 609a which are large enough to allow the user's fingers to be inserted therethrough may be respectively formed in the vertical portions 608 and 609 of the cartridge receiving members 600 and 601 as shown in FIGS. 1 to 3.

After the cartridge 3 having received solid wastes from the pet animal is removed from the cartridge receiving members 600 and 601, when the button 5 is slid toward the first end 104a of the linear slit 104 of the body 1, the cartridge receiving members 600 and 601 are retracted into the hollow portion 102 while being closed toward each other against the action of the spring 607 stretched between the cartridge receiving members 600 and 601. Then, when the closed receiving members 600 and 601 are located at the position just below the housing portion 103, a lowermost one of the cartridges 3 vertically stacked within the housing portion 103 drops down on the cartridge receiving members 600 and 601 by gravity. Thus, the lowermost cartridge 3 on the cartridge receiving members 600 and 601 comes into a stand-by condition.

It will be noted that the pooper scooper according to the present invention can be so designed as to be relatively short and compact as a whole, since the pusher means for pushing a cartridge, received by the cartridge receiving members, out from the opening of the hollow portion is movably inserted within the hollow portion and is adapted to be moved along the hollow portion by means of the button. Therefore, the pooper scooper is handy to carry.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A pooper scooper for disposing of solid wastes from a pet animal, comprising:
    a relatively short body having hollow means provided in its interior in a manner to extend along a bottom portion of said body, said hollow means having an opening formed at one end thereof as a continuation of said hollow means to communicate with the exterior of said body, linear slit means formed in the bottom portion of said body in a manner to extend along the bottom portion of said body and communicating between said hollow means and the exterior of said body, and housing means for carrying vertically stacked cartridges therein, said housing means being provided in the interior of said body, situated on said hollow means and communicating with said hollow means;
    each of said cartridges including a pair of casing members hingedly connected at one ends thereof to each other and sack means having an opening for receiving solid wastes from said pet animal, said sack means supported and contained between said casing members in a manner to be folded up;
    cartridge receiving means movably inserted in said hollow means of said body for receiving a lowermost one of said cartridges within said housing means when said lowermost cartridge drops down from said housing means toward said hollow means by gravity;
    pusher means movably inserted within said hollow means of said body for pushing out from said opening of said hollow means said cartridge received by said cartridge receiving means;
    said cartridge receiving means including a pair of cartridge receiving members pivotally connected at one ends thereof to said pusher means, and spring means provided between said cartridge receiving members to always urge said cartridge receiving members to be opened away from each other;
    first cooperating means on said cartridge receiving members and said casing members of each of said cartridges for causing one of said casing members to be held on one of said cartridge receiving members and causing the other of said casing members to be held on the other of said cartridge receiving members when each of said cartridges is received by said cartridge receiving means; and
    slidable button means arranged on an outer surface of the bottom portion of said body and supported through said slit means to said pusher means, so that when a user causes said button means to be slid along said slit means while pushing said button means, said pusher means can be moved along said hollow means while pushing said cartridge receiving means.

2. A pooper scooper as defined in claim 1, wherein said pusher means is provided with a projection projecting downwardly from an under surface thereof, said projection penetrating said linear slit means, said button means being supported to said projection.

3. A pooper scooper as defined in claim 1, wherein said body comprises a first section and a second section which are fitted together and fastened together by means of screws.

4. A pooper scooper as defined in claim 1, wherein said body is formed into a substantially streamline shape.

5. A pooper scooper as defined in claim 1, wherein said first cooperating means comprises engaging hook-like pieces and projections combination.

6. A pooper scooper as defined in claim 5, wherein each of said cartridge receiving members has a substantially L-shaped body in vertical section, said cartridge receiving members being pivotally connected at said one ends thereof to said pusher means with horizontal portions thereof being faced to each other; wherein each of said casing members takes the form of a substantially box-like body having a substantially U-like configuration in vertical section, said casing members being hingedly connected at said one ends thereof to each other with open sides thereof being faced to each other; and wherein said engaging hook-like pieces and projections combination comprises hook-like pieces formed at faced edge portions of free ends of said casing members, said hook-like pieces having root portions extending laterally from said faced edge portions of said free ends of said casing members and bent portions extending from said root portions in directions opposite to each other, and projections projecting laterally from faced edge portions of free ends of said cartridge receiving members; wherein said cartridge receiving members are so designed as to allow a space to be provided between said projections thereof when said cartridge receiving members are closed toward each other against an action of said spring means, so that when each of said cartridges drops down onto said cartridge receiving members, said root portions of said hook-like pieces of said casing members are received in the space between said projections of said cartridge receiving members and each of said bent portions of said hook-like pieces is engaged with one of said projections of said cartridge receiving members.

7. A pooper scooper as defined in claim 6, wherein each of the vertical portions of said L-shaped cartridge receiving members has a notch to allow a user's finger to be inserted therethrough.

8. A pooper scooper as defined in claim 1, wherein each of said cartridges includes second cooperating means for preventing said casing members from being accidentally opened away from each other during storage.

9. A pooper scooper as defined in claim 6, wherein said second cooperating means comprises at least one through-hole formed in one of said casing members and at least one projection provided on the other of said casing members.

10. A pooper scooper as defined in claim 1, wherein said sack means is supported at a part of a margin of said opening thereof to said casing members by means of mounting plates.

11. A pooper scooper as defined in claim 1, wherein said sack means is attached at a part of a margin of said opening thereof to said casing members by adhesives.

12. A pooper scooper as defined in claim 1, wherein said housing means is opened at an upper portion thereof and said opened upper portion of said housing means is covered by cover means.

13. A pooper scooper as defined in claim 12, wherein said cover means comprises a substantially plate-like body and first and second leaf springs which are attached at one end portions thereof to an under surface of said plate-like body, said plate-like body having a first projecting piece extending laterally from one end of said plate-like body and a second projecting piece extending laterally from the other end of said plate-like body, said first projecting piece being provided with an engaging projection extending in the direction opposite to the direction in which said first projecting piece extends, said first leaf spring having a through-hole, said leaf springs crossing each other by causing a free end of said second leaf spring to be inserted through said through-hole of said first leaf spring; wherein said pooper scooper body has a recess formed in a portion thereof which is in close proximity to said opened upper portion of said housing means, and a through-hole formed in an upper portion of a wall of said housing means which is opposite to a forming position of said recess, said recess including a dent portion extending toward said housing means; and wherein when said housing means is to be covered by said cover means, said leaf springs are inserted into said housing means, said projection of said first projecting piece is engaged with said dent portion of said recess, and said second projecting piece is inserted through said through-hole which is formed in the upper portion of the wall of said housing means.

14. A pooper scooper as defined in claim 1, further including guide means for guiding said cartridges vertically stacked within said housing means.

15. A pooper scooper as defined in claim 14, wherein each of said cartridge receiving members has a substantially L-shaped body in vertical section, said cartridge receiving members being pivotally connected at said one ends thereof to said pusher means with horizontal portions thereof being faced to each other and with root portions thereof being spaced apart from each other; wherein each of said casing members takes the form of a substantially box-like body having a substantially U-like configuration in vertical section, said casing members integrally interconnected at edge portions of sad one ends thereof through an intermediate section with opened sides thereof being faced to each other, said intermediate section being formed with a fold line extending vertically at substantially the midpoint along a width length of said intermediate section; wherein said first cooperating means comprises hook-like pieces and projections combination, said hook-like pieces and projections combination comprising hook-like pieces formed at faced edge portions of free ends of said casing members, said hook-like pieces having root portions extending laterally from said faced edge portions of said free ends of said casing members and bent portions extending from said root portions in directions opposite to each other, and projections projecting laterally from faced edge portions of free ends of said cartridge receiving members; and wherein said guide means comprises first and second spaced guide plates provided in said housing means, each of said guide plates being spaced from opposite walls of said housing means and arranged in parallel with said opposite walls of said housing means, each of said guide plates having a linear guide slit, each of said cartridges being adapted to be stored within said housing means with said casing members thereof being closed toward each other, with said intermediate section thereof being folded along said fold line, with said root portions of said hook-like pieces of said closed casing members being received in said guide slit of said first guide plate, with said bent portions of said hook-like pieces being received in a space between said first guide plate and one of said walls of said housing means, and with said folded intermediate section being received in said guide slit of said second guide plate in a manner to project at its tip end in a space between said second guide plate and the other of said walls of said housing means, said cartridge receiving members being so designed as to allow a space to be provided between said projections of said cartridge receiving members when said cartridge receiving members are closed toward each other against an action of said spring means, said cartridge receiving members being so designed as to allow said space between said projections of said cartridge receiving members to be aligned with a guide slit of said first guide plate and allow a space between said root portions of said cartridge receiving members to be aligned with a guide slit of said second guide plate when said cartridge receiving members arrive at a position just below said housing means.

16. A pooper scooper as defined in claim 15, wherein each of the vertical portions of said L-shaped cartridge receiving members has a notch to allow a user's finger to be inserted therethrough.

17. A pooper scooper as defined in claim 1, further including means for causing said cartridge receiving members to be aligned with said housing means when said cartridge receiving members are moved in a direction along said hollow means by said button means and arrive at a position just below said housing means.

* * * * *